Patented Dec. 27, 1949

2,492,828

UNITED STATES PATENT OFFICE 2,492,828

TETRAHYDROTHIENO URACILS AND METHODS OF PREPARING SAME

Bernard R. Baker, Nanuet, N. Y., assignor, by mesne assignments, to American Cyanamid Company, New York, N. Y., a corporation of Maine No Drawing. Application August 10, 1945, Serial No. 610,185

6 Claims. (Cl. 260—260)

The present invention relates to new organic compounds. More particularly, it relates to tetrahydrothieno uracils and methods of preparation thereof.

It is known (J. A. C. S. 58, page 299 (1936)) that beta-uranilino-acids such as beta-uranilino propionic acid, beta-uranilino butyric acid, etc. can be treated with hydrochloric acid to form substituted uracils. However when a trans-ureylene thiophanecarboxylic acid is treated with hydrochloric acid no uracil ring formation takes place.

I have found unexpectedly that when ureylene thiophane carboxylic acids are heated with a carboxylic acid anhydride and an alkaline catalyst, inversion of the trans isomer to the cis configuration takes place with simultaneous ring closure and formation of a substituted tetrahydrothieno uracil.

The method of preparing the thienouracils of the present invention may be illustrated by the following general equation:

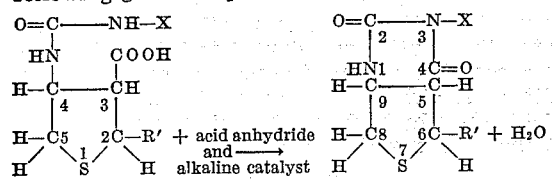

in which X is a member of the group consisting of hydrogen, aliphatic, and aromatic radicals, and R' is a non-functional radical such as hydrogen, alkyl, carboxy, carboxyalkyl, carbalkoxyalkyl, carbaryloxyalkyl or other organic radical which does not react with the reagents employed in the reaction.

In general, the compounds of the present invention are white crystalline solids, slightly soluble in water, methanol, ethanol, dioxane, and other oxygenated solvents. They are particularly useful as intermediates in the preparation of compounds having biological activity for example biotin.

In preparing the compounds of the present invention I heat a ureylene thiophane carboxylic acid with an anhydride of a carboxylic acid, preferably a volatile one, such as acetic anhydride or propionic anhydride and an alkaline substance such as potassium acetate, sodium acetate, and tertiary organic bases such as pyridine, triethylamine, etc. The reaction mixture is heated at a temperature of from 60°–180° C. for from one-half hour to five hours. I prefer to carry out the reaction at refluxing temperatures which usually takes from about ten minutes to two hours to complete. Although a solvent is usually not necessary, I can, if desired, use a solvent such as acetic acid.

When carrying out the reaction described above, using an anhydride such as acetic anhydride a uracil compound is obtained having an acetyl radical attached to the nitrogen directly attached to the thiophane nucleus. While this intermediate can be isolated, as shown in the specific examples, I prefer not to isolate it, but to heat the reaction mixture with a mineral acid thus removing the group. The desired product of the invention is then recovered from the reaction mixture by adding water to precipitate it and separating by filtration. The product can be further purified by recrystallization from methyl Cellosolve, water, methanol, ethanol, propanol or mixtures thereof.

I can use a large number of ureylene-thiophane carboxylic acids as intermediates to prepare the compounds of the present invention. Among these may be mentioned specifically 2-(delta-carboxybutyl) - 4-uramidothiophane-trans-3-carboxylic acid, 2-(delta-carboxybutyl)-4-uranilinothiophane-trans-3-carboxylic acid, 2-(epsilon-hydroxyamyl)-4-uranilinothiophane - trans-3 - carboxylic acid, 2 - propyl - 4 - uranilinothiophane - trans-3-carboxylic acid, 2-(delta-carboxybutyl)-3-uranilinothiophane - trans - 4-carboxylic acid, 2-carboxy - 3 - uranilinothiophane-trans-4-carboxylic acid, 2-(delta-carboxybutyl) - 4-methylureylenethiophane - trans - 3-carboxylic acid, 2-(delta-carboxybutyl)-3 - methylureylenethiophane-trans - 4 - carboxylic acid, 2-(gamma-carboxypropyl)-4-uranilinothiophane - trans - 3-carboxylic acid, 2-(delta-phenoxybutyl)-4-uranilinothiophane-trans-3-carboxylic acid, 2-(gamma - carboxypropyl) - 3 - uranilinothiophane-trans-4-carboxylic acid, 2-(gamma-methoxypropyl)-3-uranilinothiophane-trans-4 - carboxylic acid, 2 - (gamma-carboxypropyl)-4-methylureylenethiophane - trans-3-carboxylic acid, 2-(gamma - carboxypropyl) - 3 - methylureylenethiophane-trans-4-carboxylic acid, 4 - uranilinothiophane - trans-3-carboxylic acid, 4 - methylureyl-enethiophane-trans-3-carboxylic acid, 2-(delta-carboxybutyl)-4-ethylureylenethiophane - trans-3-carboxylic acid, 2-(deta-carboxybutyl)-3-ethylureylenethiophane-4-carboxylic acid, and others. These compounds are new and form the subject matter of my copending application Serial No. 605,467, filed July 16, 1945, now Patent Number 2,453,564.

The process of the present invention provides a method of converting 3,4-substituted-transthiophanes into the cis configuration. In order to obtain dl biotin the 3,4-diaminothiophane used in the final step of my process should have the cis configuration. I can obtain the desired 3,4-cis-diaminothiophane from the thienouracils of the present invention by cleaving the uracil ring with hydrazine hydrate to obtain a ureylenethiophane cis carboxhydrazide. These compounds can be made to undergo a simultaneous rearrangement and ring closure giving a substituted imidazolidothiophane. The imidazolidothiophanes can be converted to a 3,4-cis-diaminothiophane which is directly convertible to dl biotin by treatment with phosgene.

My invention will now be illustrated in greater detail by means of the following specific examples, in which representative thienouracils are prepared from corresponding ureylenethiophane carboxylic acids. It will be understood, of course, that these examples are given for purposes of illustration and are not to be considered as limiting my invention to the particular details described therein.

*Example 1*

To a hot solution of 2.6 g. of 2-(delta-carbomethoxybutyl)-3-carbomethoxy - trans - 4 - uranilinothiophane

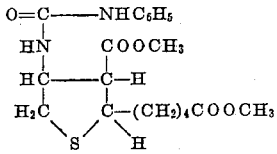

in 50 cc. of methanol was added 15 cc. of 10% sodium hydoxide solution. After being boiled on a steam bath for 1 hour, during which time most of the methanol evaporated, the solution was diluted wtih water, clarified with Norite and acidified. The product was collected on a filter. A yield of 2.2 g. (92%) of 2-(delta-carboxybutyl)-3-carboxy-trans-4-uranilinothiophane was obtained having a melting point of 182°-183° C.

A mixture of 100 mg. of 2-(delta-carboxybutyl)-3-carboxy-trans - 4 - uranilinothiophane, 50 mg. of anhydrous sodium acetate and 1 cc. of acetic anhydride was refluxed five minutes. Addition of 10 cc. of water gave a turbid solution and a gum. The turbid solution was decanted and deposited on standing 45 mg. of crystals. The product 1-acetyl - 3 - phenyl-6-(delta-carboxybutyl) - 5,6,8,9 - tetrahydrothieno[3,4,e,cis] uracil when recrystallized from dilute ethanol had a melting point of 191°-195° C. and was soluble in aqueous sodium bicarbonate solution.

*Example 2*

A mixture of 100 mg. of 2-(delta-carboxybutyl)-4-uranilinothiophane - trans - 3 - carboxylic acid, 100 mg. of anhydrous sodium acetate and 2 cc. of acetic anhydride was refluxed one hour, then diluted with 2 cc. of 6 N hydrochloric acid and refluxed an additional thirty minutes. Dilution with water gave crystals, yield 50 mg. (53%). Two recrystallizations from water containing a little methanol gave white crystals of 3-phenyl-6-(delta-carboxybutyl) - 5,6,8,9 - tetrahydrothieno[3,4,e,cis]uracil melting at 197°-199° C. with decomposition.

*Example 3*

A mixture of 2.9 g. of 2-(delta-carboxybutyl)-4-uranilinothiophane - trans - 3 - carboxylic acid 2.9 g. of anhydrous sodium acetate and 60 cc. of acetic anhydride was refluxed one hour, then diluted with 30 cc. of water. After the acetic anhydride had decomposed, 30 cc. of concentrated hydrochloric acid was added and the mixture refluxed for thirty minutes. The mixture was clarified by the use of Norite, using 50% acetic acid as a wash. The solution was evaporated to a paste in vacuo, diluted with water and the product removed by filtration. A yield of 2.1 g. (76%) of 3 - phenyy-6-(delta-carboxybutyl)-5,6,8,9-tetrahydrothieno[3,4,e,cis]uracil

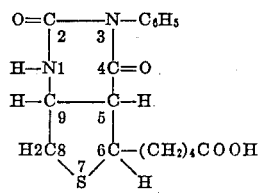

was obtained as white crystals melting at 193°-196° C. with decomposition.

*Example 4*

A mixture of 100 mg. of 4-uranilinothiophane-trans-3-carboxylic acid, 100 mg. of anhydrous sodium acetate and 1 cc. of acetic anhydride was refluxed for two hours. When the reaction mixture was diluted with water the product separated as white crystals. A yield of 85 mg. (78%) of 1-acetyl - 3 - phenyl-5,6,8,9-tetrahydrothieno[3,4,-e,cis]uracil was obtained which on recrystallization from methyl Cellosolve gave white crystals melting at 240°-241° C.

To a hot solution of 105 mg. of the product obtained immediately above in 5 cc. of acetic acid was added 2 cc. of 6 N hydrochloric acid. After being heated, on the steam bath for thirty minutes, the solution was diluted to 25 cc. with water, cooled in ice and the product collected on a filter. A yield of 70 mg. (78%) of 3-phenyl-5,6,8,9-tetrahydrothieno[3,4,e,cis]uracil was obtained, melting at 237°-239° C.

*Example 5*

A solution of 5.3 g. of thiophane-3,4 cis-dicarboxylic anhydride

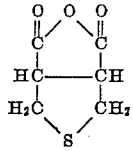

(obtained from thiophane-3,4-trans-dicarboxylic acid by heating with propionic anhydride) in 20 cc. of methanol was refluxed for ninety minutes. Evaporation and recrystalization from benzene gave 3.8 g. of thiophane-3,4-cis-dicarboxylic acid and monomethyl ester, melting point 107.5-109° C. A mixture of 5 g. of this monomethyl ester, 5 cc. of thionyl chloride and 15 cc. of benzene was refluxed for twenty minutes. After removal of the solvent, the residue was dissolved in 25 cc. of acetone and stirred with 2.5 g. of sodium azide in 25 cc. of water for one hour. The oil was extracted with chloroform, dried and refluxed for about two hours, then treated with 10 cc. of aniline and refluxed five minutes. The mixture was washed with dilute hydrochloric acid and evaporated. The crude cis 3-carbomethoxy-4-uranilino-thiophane

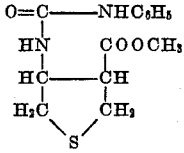

heated at 100° C. with 7 cc. of hydrazine hydrate for one hour, then diluted with water and benzene. A yield of 4.2 g. (57%) of 4-uranilinothiophane - cis - 3 - carboxyhydrazide was obtained which on recrystallization from water melted at 183°–185° C.

A solution of 1.00 g. of the compound obtained immediately above in 20 cc. of 6 N hydrochloric acid was heated on the steam bath for two hours. During this time crystals of the uracil separated from the hot solution. The product was separated from the reaction mixture by filtration. A yield of 0.65 g. (74%) of 3-phenyl-5,6,8,9-tetrahydrothieno[3,4,e,cis]uracil

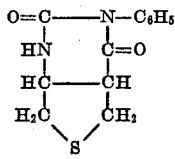

was obtained which on recrystallization from methyl Cellosolve gave white crystals melting at 238°–239° C.

I claim:

1. Chemical compounds having the general formula:

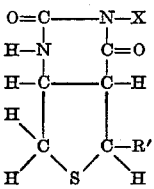

in which X is an aryl radical and R' is a carboxyalkyl radical.

2. Chemical compounds having the general formula:

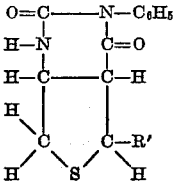

in which R' is a carboxyalkyl radical.

3. 3-phenyl - 6 - (delta-carboxybutyl) - 5,6,8,9-tetrahydrothieno[3,4,e,cis]uracil.

4. A method of preparing compounds having the general formula:

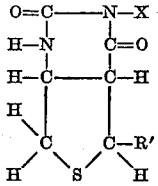

in which X is an aryl radical and R' is a carboxyalkyl radical which comprises heating a compound having the formula:

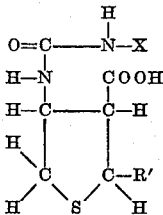

in which X and R' are as defined above, with a carboxylic acid anhydride and an alkaline catalyst and subsequently with a mineral acid.

5. A method of preparing compounds having the general formula:

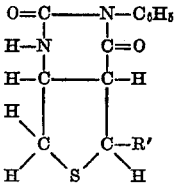

in which R' is a carboxyalkyl radical which comprises heating a 2-carboxyalkyl-4-uranilinothiophane-3-carboxylic acid with a carboxylic acid anhydride and an alkaline catalyst and subsequently with a mineral acid.

6. A method of preparing 3-phenyl-6-(delta-carboxybutyl) - 5,6,8,9 - tetrahydrothieno[3,4,e,-cis]uracil which comprises heating 2-(delta-carboxybutyl)-4-uranilinothiophane - 3 - carboxylic acid with an alkali metal acetate and acetic anhydride and subsequently with a mineral acid.

BERNARD R. BAKER.

REFERENCES CITED

The following references are of record in the file of this patent:

UNITED STATES PATENTS

| Number | Name | Date |
|---|---|---|
| 2,432,961 | Baker | Dec. 16, 1947 |